Sept. 25, 1962
S. A. LUNDEEN
3,055,994
CONTROL DEVICE
Filed Oct. 30, 1957
2 Sheets-Sheet 1
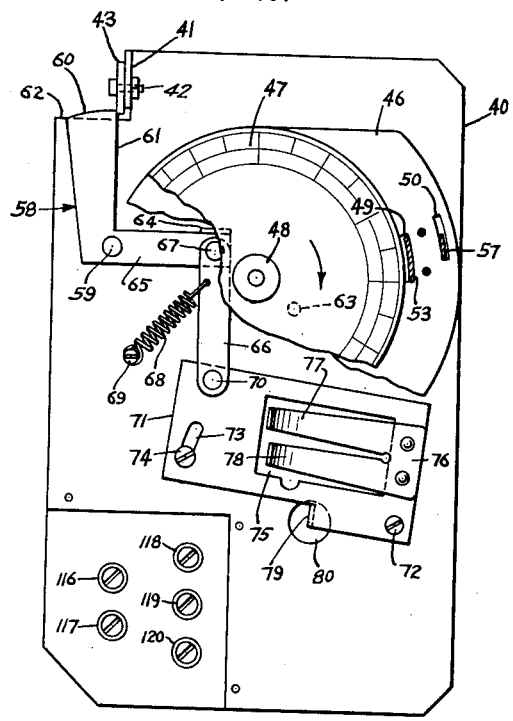
FIG. 1
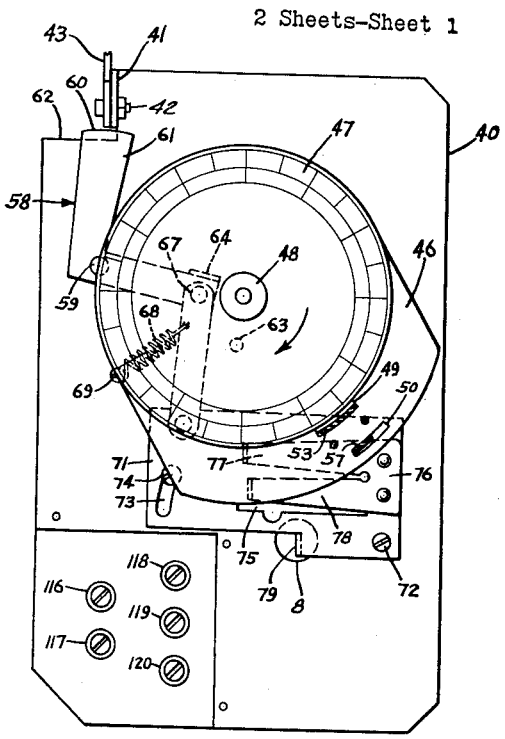
FIG. 2
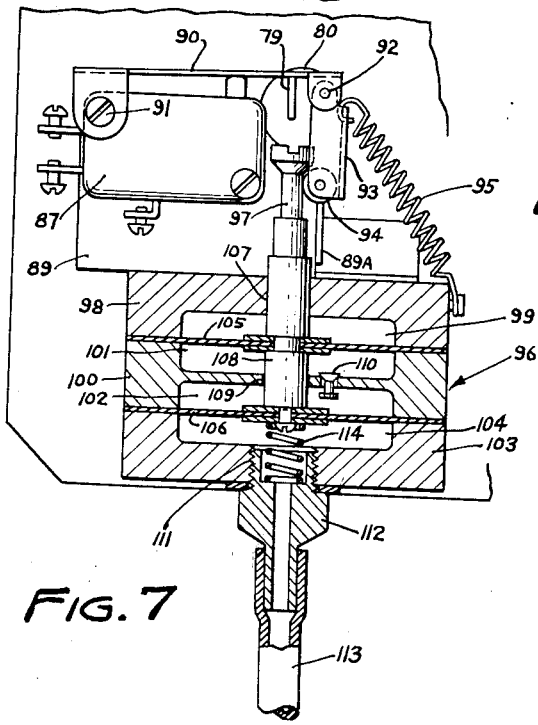
FIG. 7
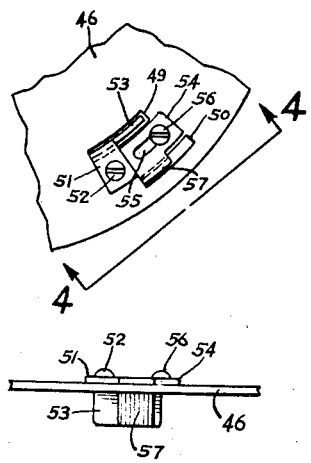
FIG. 3
FIG. 4
INVENTOR.
STANLEY A. LUNDEEN
BY
Moore White & Burd
ATTORNEYS Sept. 25, 1962     S. A. LUNDEEN     3,055,994
CONTROL DEVICE Filed Oct. 30, 1957                                   2 Sheets-Sheet 2

INVENTOR.
STANLEY A. LUNDEEN
BY
Moore, White & Burd
ATTORNEYS

# United States Patent Office

3,055,994
Patented Sept. 25, 1962

3,055,994
CONTROL DEVICE
Stanley A. Lundeen, 2946 Stinson Blvd.,
Minneapolis 18, Minn.
Filed Oct. 30, 1957, Ser. No. 693,481
17 Claims. (Cl. 200—38)

This invention relates to a device for controlling the operation and timing of one or more electrically actuated and energized mechanisms such as solenoids. More particularly, this invention relates to a clock device for initiating and controlling the sequence of energization of a plurality of solenoids which, in turn, control fluid flows in a water softening system.

The control device of this invention finds special utility in water softening systems and for convenience, will be described in detail as used for that purpose. It will be understood, however, that the utility of the control device is not so limited but may be readily adapted to control the sequence of operation of other electrically energized mechanisms.

Water softening systems presently in widespread use operate upon an ion exchange principle. It is well known that the so-called "hardness" in water is due principally to dissolved calcium and magnesium salts. It is also well known to soften hard water by passing it through a bed of ion exchange material so that in the course of its passage through the ion exchange material, the calcium and/or magnesium ions are replaced by sodium ions from the exchange material.

The capacity of ion exchange materials to replace calcium and magnesium ions with sodium ions is, of course, not unlimited. After exhaustion, the ion exchange materials may, however, be regenerated by passing a solution containing sodium ions, usually a brine solution, through the bed of ion exchange material and the reverse reaction takes place wherein sodium replaces calcium and magnesium in the ion exchange material and the calcium and magnesium ions are flushed from the system as chlorides.

For any given water softener installation, the capacity of the bed of ion exchange material is known and the average hardness of the water used at that installation is also known. The average amount of water used at any given installation can readily be calculated. From these known facts, the frequency with which the bed of ion exchange material must be regenerated to insure a constant supply of soft water can readily be calculated. Depending upon the capacity and volume of ion exchange material, the hardness of the water and the water consumption, the frequency with which the ion exchange material must be regenerated may vary widely from every day or two, to once every two weeks or so.

Because, in most installations, hard water is drawn at the soft water taps during periods of regeneration, it is customary that the regeneration cycle be carried out during periods of low water consumption, usually in the middle of the night. For this reason, and because water consumption may fluctuate widely from hour to hour and day to day, it is the usual practice to provide a wide margin of safety so that the ion exchange material is regenerated before its exchange capacity has become exhausted. This insures that the user will be constantly supplied with soft water.

Thus, for example, in a typical installation of a completely automatic home water softening system, it may be determined on the basis of the volume and capacity of the water softener, the hardness of the water, and the average water consumption of the household that regeneration is necessary every fourth day. In order to provide for normal fluctuations in water consumption in such an instance, while still insuring a constant supply of soft water, the timing mechanism would be set so as to initiate the regeneration cycle every third day at an hour of low water consumption, such as 3:00 a.m. The one day margin of safety would guard against exhaustion of the bed of water softening material due to the use of larger than normal amounts of soft water as would be occasioned by such circumstances as laundry days, a temporary increase in the size of the household caused by visitors, increased water consumption due to hot weather, etc. Thereafter, the bed of water softening mineral will be regenerated every third day at 3:00 a.m. regardless of the amount of water actually used. Thus, for example, if the householder is away for a two weeks vacation, his water softening system will regenerate itself every third day in spite of the fact that no water has been used. Since no hard water has passed through the system and generation is not, therefore, necessary, the brine and power required to carry out the useless regeneration cycle is wasted.

In my co-pending application, Serial No. 676,777, filed August 7, 1957, there is disclosed and claimed a metering valve by which the water used to prepare a saturated brine solution for passage through the bed of ion exchange water softening material in a water softening system during the regeneration cycle is metered into a brine generating vessel in fixed predetermined proportion to the amount of water consumed, whereby regeneration is dependent upon the amount of water consumed. It is the principal object of this invention to provide a time control device for initiating the regeneration cycle at the next following preselected convenient time after a volume of brine adequate to regenerate the mineral bed has been accumulated from the metered predetermined small proportion of the total water consumed from the system.

It is another object of this invention to provide a time control device by which the solenoid controlled valves regulating the flows in a water softening system may be energized in time sequence to reverse the flow of brine initially passed through the mineral water softening bed for a second passage through the bed in the opposite direction in order to achieve maximum utilization of the brine and maximum exchange of sodium ions for the calcium and/or magnesium ions in the mineral bed.

It is still another object of this invention to provide a time control device by which the solenoid operated valves which regulate the flows of water in an automatic water softening system may be energized after a predetermined time interval to again reverse the flows in the water softening system to again force any remaining brine through the mineral water softening bed and to backwash the mineral bed to flush the brine and any accumulated silt, rust, etc., from the system with fresh water.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings in which the same numerals refer to corresponding parts and in which:

FIGURE 1 is a front elevation of a preferred embodiment of the time control device of this invention as it appears during the water softening cycle, shown with the clock face dial partly broken away to expose the elements underneath;

FIGURE 2 is a similar front elevation showing the time control device as it appears during the water softening cycle after a sufficient volume of brine has been generated to indicate the need for regeneration of the mineral bed, but before the selected convenient time for regeneration has arrived;

FIGURE 3 is a fragmentary enlarged portion of the face of the clock dial and showing in greater detail the actuating trip tabs for initiating the regeneration cycle and the back wash portion of that cycle;

FIGURE 4 is an end elevation of a fragment of the clock dial taken generally on the line 4—4 of FIGURE 3 and in the direction of the arrows;

FIGURE 7 is an enlarged detail view, partly in section of a vacuum operated, time delay switch and associated mechanism as they appear during the water softening cycle.

Figure 5:
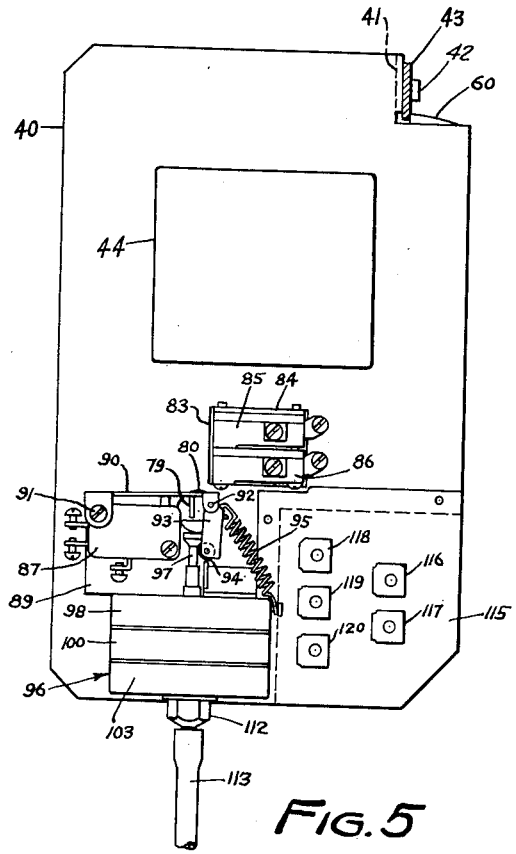
FIGURE 5 is a rear elevation of the time control device as it appears during the water softening cycle.

Referring to the drawings, and particularly to FIGURES 1, 2, 5, and 6, the time control device includes a mounting plate 40, having an upper forwardly projecting float arm bracket 41 to which is pivotally secured at 42 a float arm 43, the opposite end of which (not shown) is relatively rigidly secured to a float in the brine generating tank of an automatic water softening system. A standard electric clock motor 44 is mounted on the back of mounting plate 40. The shaft 45 of clock motor 44 is provided with a face plate 46 preferably keyed or tightly press fit onto the shaft.

A clock dial face 47 is mounted on the front of face plate 46 and secured by means of a nut 48. The clock dial face 47 is mounted to rotate with the face plate 46 as driven by the clock motor, but is rotatably movable with respect to the plate 46 when the nut 48 is loosened in order to permit setting of the control device to initiate actuation of the electrically energized mechanisms at any selected desired time. A portion of the face plate 46 extends beyond the periphery of the clock dial face 47 and is provided with a pair of tab slots for positioning hold down tabs by which the operations during the regeneration cycle are initiated, as explained in greater detail hereinafter. Plate 46 has an inner tab slot 49 and an outer tab slot 50 spaced outwardly therefrom and slightly back, opposite from the direction of rotation of the face plate.

The regeneration tab element 53 is attached to face plate 46 by means of a screw 52 and has a projecting spring hold down tab 53 which extends through the slot 49 beyond the back surface of the face plate. Back wash trip tab element 54 is adjustably mounted on the face of plate 46 by virtue of slot 55 and screw 56 and has a hold down tab 57 which extends through the outer slot 50 and projects from the back surface of the face plate 46. As will be explained in greater detail hereinafter, the regeneration cycle is initiated when the leading edge of the spring hold down tab 53 passes a predetermined point.

The duration of the regeneration cycle is determined by the length of the tab 53. The back wash portion of the regeneration cycle is initiated when the leading edge of the hold down tab 57 passes a predetermined point in its course of travel and the length of the back wash portion of the regeneration cycle is determined by the length of tab 57. The time interval between the initiation of the back wash portion of the regeneration cycle is determined by the relative peripheral spacing of the leading edges of the hold down tabs and may be varied by adjusting of tab element 54. For clarity in showing the positions of hold down tabs 53 and 57 in slots 49 and 50 respectively, the tabs are shown in section in FIGURES 1 and 2 with the fastening elements for the tabs omitted. The structure of these elements is fully shown in FIGURES 3 and 4.

A right angle latch arm 58 is pivoted at 59 to the front face of the mounting plate 40. The end 60 of the vertical portion 61 of the latch arm 58 extends beyond the upper edge 62 of the mounting plate 40 adjacent to the float arm bracket 41. As shown in FIGURE 1, the latch arm is held in softening position by the float arm 43, but when the float arm is lifted by virtue of a rise in the level of brine in the brine tank, the latch arm 58 assumes the position for regeneration as shown in FIGURE 2. The latch arm 58 is returned to its normal water softening position by virtue of a pin or lug 63 on the back surface of clock face plate 46, striking against a forwardly projecting lip 64 on the upper edge of the horizontal portion 65 of the latch arm.

One end of a link 66 is pivotally connected at 67 to the free end of the horizontal portion 65 of the latch arm 58. Tension is applied to link 66 by means of a coil spring 68, the opposite end of which is secured to the mounting plate 40 at 69. The tension exerted by spring 68 upon link 66 is transmitted to the latch arm 58 so as to urge it into the position of regeneration. Movement in this direction is normally prevented by the interposition of the float arm 43.

The opposite end of link 66 is pivotally connected at 70 to an actuator spring plate 71 which is pivotally secured to the front surface of the mounting plate 40 for movement thereagainst. The actuator spring plate 71 is provided with a guide slot 73 which moves with respect to a guide pin, bolt or rivet 74 on the front surface of the mounting plate 40. The spring actuator plate 71 is provided with an opening 75 over which is disposed a bifurcated leaf spring element 76 having an upper spring member 77 and a lower spring member 78, both of which are upturned at their free ends. The lower edge of actuator spring plate 71 is provided with a rearwardly projecting arm 79 which extends through an opening 80 in mounting plate 40 to the back of the control device. The normal position of the actuator spring plate and spring members during the water softening cycle is shown in FIGURE 1, and the position of the actuator spring plate and springs when ready for initiating the regeneration cycle, is shown in FIGURE 2.

Figure 6:
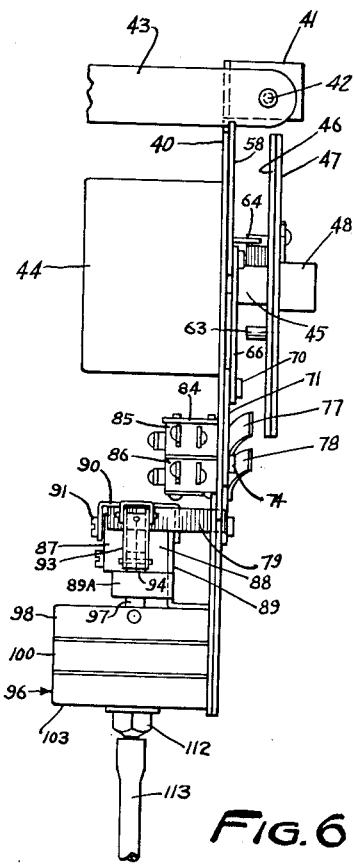
FIGURE 6 is an end elevation of the time control device.

Referring now particularly to FIGURES 5 and 6, which show the back of the time control device, mounting plate 40 is provided with another opening 83 which is in substantial registry with opening 75 in actuator spring plate 71 when the spring plate is in its lower or regenerating position. A bracket 84 extending backward from the back surface of the mounting plate 40 supports a pair of microswitches 85 and 86.

Figure 8:
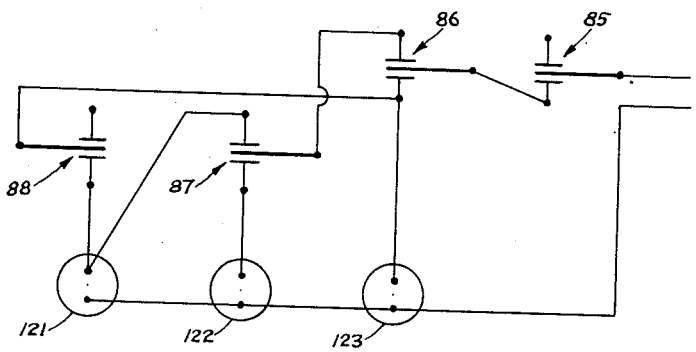
FIGURE 8 is a circuit diagram of the switches and solenoids controlled by the device of this invention.

Each of the microswitches used in this control device is a commercial single pole, double throw switch as shown diagrammatically in FIGURE 8. The switch buttons are normally urged outwardly by an internal spring and when in this position, make contact in one circuit. When depressed they make contact in another circuit. Thus, each microswitch is provided with three lead-out connectors. Since per se they form no part of the invention, and to avoid unduly incumbering the drawings with unnecessary numerals, the individual elements of the several microswitches are not identified by numerals.

Microswitches 85 and 86 are so positioned with respect to opening 83 that when the actuator spring plate 71 is in regenerating position, as shown in FIGURE 2, the actuator buttons of microswitches 85 and 86 lie under spring members 77 and 78, respectively. Another pair of identical microswitches 87 and 88 are supported spaced back from the rear surface of mounting plate 40 by means of a bracket 89. A broad flat contact arm 90 is pivotally mounted at 91 to the microswitch bracket 89 so as to overlie the actuating buttons of both microswitches 87 and 88 so as to depress or release them simultaneously. The lower surface of contact arm 90 lies above arm 79 which projects backwardly through opening 80 from the actuator spring plate 71.

The free end of the contact arm 90 is pivotally connected at 92 to a channel-shaped latch member 93. The free end of the latch member 93 partially encloses a freely rotatable roller 94. A coil spring 95 is attached at one end to the pivoted end of the channel latch member 93 and at the other end to the housing of a vacuum dash-pot housing indicated generally at 96. The tension of coil spring 95 tends to urge the latch roller 94 into contact with the surface of a vacuum switch plunger 97 where the roller is held by the upper surface of a horizontal arm 89A of bracket 89.

The vacuum switch dash-pot housing 96 comprises a top cap 98 having an internal cavity 99, an intermediate body portion 100 having an upper internal cavity 101 and a lower internal cavity 102 and a lower cap member 103 having an internal cavity 104. A resilient diaphragm 105 is positioned and held between the upper cap 98 and intermediate body portion 100 and a similar resilient diaphragm 106 is disposed and held between the intermediate body portion 100 and lower cap portion 103. A central aperture extends through each of the dash-pot body portions. Plunger 97 extends through the opening 107 in the upper cap portions 98 and a cylindrical piston 108 fits with a loose sliding fit in opening 109 in the intermediate body portion 100.

Plunger 97, diaphragm 105, piston 108, and diaphragm 106 are assembled to move together as a unit. Dash-pot chambers 101 and 102 are filled with oil or similar liquid. A check valve 110 shuts off direct rapid flow of fluid from chamber 101 to chamber 102 while permitting rapid return flow of fluid in the opposite direction. The central opening 111 in the bottom cap member is tapped and is provided with a fitting 112 to which is connected a piece of pipe or tubing 113 to a vacuum source. A coil spring 114 seated in a channel in fitting 112 presses upwardly against the bottom surface of diaphragm 106, normally to urge the diaphragms, piston and plunger upwardly.

In the case of a water softening system, the vacuum source to which tube 113 is connected is that created by virtue of a flow of water passing through a venturi tube whose throat is connected to the brine tank of the softening system. Reference is made to my co-pending application, Serial No. 496,802, now Patent No. 2,902,155 wherein such a venturi and brine tank combination is illustrated and described. As soon as the brine is exhausted from the brine tank, the float valve at the bottom of the brine tank automatically seats, but the flow of fluid through the venturi continues to apply suction on the brine tank line. In a water softening system utilizing the time control of this invention, tube 113 is in communication with the brine tank line so that when all of the brine has been sucked from the brine tank and the brine tank valve has closed, the continuing suction created by the venturi is applied through tube 113 and fitting 112 to the lower chamber 104 of the vacuum switch dash-pot housing.

When vacuum is applied to chamber 104, diaphragm 106 is drawn downwardly and because they are all interconnected, piston 108, diaphragm 105 and plunger 97 are similarly drawn downwardly. The movement of the diaphragms 106 and 105 has the effect of enlarging chamber 102 while making chamber 101 smaller. Since both of these chambers are filled with a relatively incompressible fluid, such as oil, chamber 101 can become smaller only if part of the oil contained in that chamber can be expelled. This is accomplished by forcing the oil to pass through opening 109 around the periphery of piston 108 and into chamber 102. Direct flow is prevented by check valve 110.

Because the clearance between piston and opening is relatively small, the rate of flow of oil from chamber 101 to chamber 102 is relatively slow. Because of this, a time lag of from about 30 to 60 seconds occurs before the plunger 97 is withdrawn into the vacuum switch dash-pot body far enough to force roller 94 outwardly over bracket arm 89A to release the latch 93 and permit contact plate 90 to depress the actuator buttons of microswitches 87 and 88. Upon release of the vacuum at the end of the regeneration cycle, coil spring 114 assists the plunger, diaphragms and piston to return to their normal position. Check valve 110 permits unimpeded flow of oil from chamber 102 back into chamber 101.

The mounting plate 40 is provided with a terminal board or panel 115 formed of some electrically insulating material such as fiber board, phenolic resin, or the like. The terminal board is provided with a plurality of terminal connections 116–120 by which conductors are connected to complete the circuits between the power source and switches and the solenoids or other mechanisms whose sequence of operation is regulated by the control device of this invention. The circuit by which the microswitches of the control device are connected to regulate the operation of three solenoids 121, 122, and 123, which, in turn, control flows of water in a water softening system, is shown diagrammatically in FIGURE 8. In the circuit diagram, the microswitch poles are shown in a neutral position. It is to be understood, however, that depending upon whether the actuating button is depressed from outside or pushed outwardly under influence of internal spring pressure contact will be made with one contact plate or the other in each switch at all times.

*Operation*

The time control device of this invention finds its maximum utilization as part of a water softening system including three solenoid controlled valves for regulating water flows, such as is illustrated and described in my co-pending application Serial No. 716,151, filed February 19, 1958. To place the time control device in operation after installation of the water softening system, the nut 48 is loosened in order to permit rotation of the clock dial relative to the face plate 46. The clock dial 47 is rotated until the graduation representing the preselected convenient hour for regeneration (for example, 3:00 a.m.) is adjacent to the leading edge of the inner spring hold down tab 53. Nut 48 is tightened to hold the clock face in this position. The face plate and the clock dial are then rotated together by hand until the graduation representing the then time of day approximately directly overlies the free upturned end of the upper leaf spring member 77.

The clock motor is then plugged into a convenient source of electric power such as 60 cycle, 110 volt house current. At this time, no current flows through the control device circuit because the pole of microswitch 85 is in its upper position in contact with a dead line. The brine tank is presumed to be empty so that the float and float arm are in their lowermost position and the right angle latch arm 58 is held in place by the float arm 43 in the position shown in FIGURE 1. So long as the latch arm 58 is in this position, the actuator spring plate 71 which is linked to the latch arm by means of link 66 is in the elevated position shown in FIGURE 1.

So long as the latch arm and actuator spring plate are in this position, the clock may rotate the face plate 46 indefinitely without triggering the regeneration cycle. This is because the inner spring hold down tab 53 which projects from the back of face plate 46, in the course of the rotation of the face plate, passes through the space between the leaf spring members 77 and 78 and thus does not press upon either spring member. Similarly, the outer spring hold down tab 57 which projects from the back of the face plate 46 passes below the upturned end of spring member 78 without contacting the spring member.

At the same time the projecting arm 79 of the actuator spring plate which extends through the opening 80 to the back of the control device supports the contact arm 90 so as to prevent pressure by the contact arm upon the actuator buttons of the microswitches 87 and 88. So long as the ion exchange mineral bed of the water softening system retains its water softening capacity and is not in need of regeneration, the control device can run indefinitely without triggering the regeneration cycle. Thus, if water consumption is low, or if the householder is away and no water is used, this system does not undergo unnecessary regeneration based upon a definite time cycle.

When a sufficient volume of hard water has passed through the water softening mineral bed such that the bed is approaching exhaustion of its softening capacity, that fact is reflected in the level of brine in the brine tank of the water softening system since the brine tank contains a predetermined small proportion of the total volume of water consumed. This predetermined proportion of the water actually used has been metered into the brine tank by the metering valve of my aforesaid co-pending application, Serial No. 676,777.

When the level of brine in the brine tank has reached the predetermined level which indicates need for regeneration of the mineral bed, the float which is relatively rigidly connected to the end of float arm 43 will have risen in the brine tank and, at the predetermined level, will be exerting sufficient upward pressure upon the float arm to force it upwardly and to release the latch arm 58. When the latch arm 58 is no longer held by the float arm 43, the tension of coil spring 68 upon link 66 will pull the horizontal portion 65 of the latch arm downwardly, the latch arm rotating on pivot 59. Because the actuator spring plate 71 is rigidly linked to the latch arm, the spring plate 71 will be forced downwardly into the position shown in FIGURE 2, rotating around pivot 72.

It is unlikely that the brine tank level calling for regeneration will be reached at about the hour of the day or night preselected for the regeneration cycle since that time was chosen because it is a period of minimum or no water consumption. Thus, it is almost certain that at the time the latch arm is released and the actuator spring plate is lowered, the spring hold down tabs 53 and 57 on the face plate 46 will be some distance removed from the unturned ends of spring members 77 and 78. Accordingly, the regeneration cycle will not be initiated immediately after the need for regeneration has been established by the level of the brine tank but at the next preselected convenient time.

As the hold down tabs next approach the spring members, the positions of the spring members have changed to lie in the path of the tabs so that instead of passing around the upturned edges of the spring members, the hold down tabs will now pass directly over them and press them down against the actuator buttons of microswitches 85 and 86, respectively. Because of the differences in position of slots 49 and 50 and of hold down tabs 53 and 57, the spring members 77 and 78 are not contacted at the same time. Spring member 77 is first contacted by the leading edge of the spring hold down tab 53 in the course of its travel with the face plate 46.

When tab 53 contacts the spring 77, it is depressed and pushed down against the actuator button of microswitch 85. This changes the position of the pole of the switch into contact with the other contact plate. By reference to the circuit diagram, it will be seen that when this happens, line current can thus flow through microswitch 85 to microswitch 86 whose pole contacts the upper contact plate, since its actuator button is not pushed down, and thence to microswitch 87 whose pole is similarly in contact with the upper contact plate, since its actuator buttons is not depressed, and thence to solenoid 121 which is energized. It should be noted that although the shift in position of actuator spring plate 71 retracted projecting arm 79 from contact arm 90, that arm is prevented from depressing the actuator buttons of microswitches 87 and 88 because held in its upper position by latch 93.

When the solenoid 121 is energized, the hard water supply to the water softener tank is closed and the hard water supply is bypassed to the soft water line so that if the householder draws water from his tap while the regeneration cycle is in progress, he will draw hard water. This is the primary reason for electing an hour of minimum water consumption for regeneration. At the same time that the hard water flow is bypassed to the soft water line, the drain valve for up-flow regeneration of the water softening system is opened and water is injected through the venturi of the water softening system to draw brine from the brine tank, to force it up through the bed of ion exchange resin from the bottom of the water softener tank and out through the drain. After all of the brine has been withdrawn from the brine tank, the float in the bottom of the brine tank seats in its resilient valve seat so that a vacuum is created in the brine tank line to the venturi.

Tube 113 which is connected to the vacuum switch dash-pot body 96 is in communication with the brine tank line. As soon as all of the brine has been drawn from the brine tank and vacuum is created in the brine tank line, suction is applied through tube 113 to the lowermost chamber 104 of the vacuum switch dash-pot. Vaccum in chamber 104 tends to draw resilient diaphragm 106 downwardly. This downward movement is delayed by the oil dash-pot between diaphragms 106 and 105.

Since diaphragms 106 and 105 and cylinder 108 and plunger 97 are all connected to move as a unit, diaphragm 106 cannot be appreciably moved without like movement by diaphragm 105. Before diaphragm 105 can be moved appreciably the oil from chamber 101 must be displaced. This is accomplished by forcing the oil from chamber 101 through opening 109 around the periphery of cylinder 108 and into chamber 102 under the influence of the suction applied to the lower side of diaphragm 106 and transmitted by means of cylinder 108 to diaphragm 105.

Because the clearance between cylinder 108 and opening 109 is small, the rate of flow of oil from chamber 101 to chamber 102 is slow, the time delay being of the order of from about 30 to 60 seconds. This creates a corresponding time delay between the time all of the brine has been drawn from the brine tank and the initiation of the second reverse flow portion of the regeneration cycle. Direct rapid flow of oil from chamber 101 to chamber 102 is prevented by check valve 110. Thus, because of the oil dash-pot between the two diaphragms, plunger 97 is slowly retracted downwardly into the vacuum switch dash-pot body. As the plunger 97 is retracted, its enlarged head pushes against roller 94 to release it from bracket arm 89A to free latch member 93. When this occurs, spring 95 acting upon latch member 93 pulls upon the contact arm 90 and the contact arm depresses the actuator buttons of the microswitches 87 and 88.

It will be seen by reference to the circuit diagram, that line current will now flow through switch 85 to switch 86 whose pole is still in contact with the upper contact plate, thence to microswitch 87, whose pole has now been moved from the upper to the lower contact plate to break the circuit to solenoid 121, and on to energize solenoid 122. When solenoid 122 is energized, the water flow through the valve which it controls closes the drain for up-flow regeneration and opens the drain for downflow regeneration, and, at the same time, supplies water to the top of the water softener tank.

The reason for the delay in the initiation of this second portion of the regeneration cycle is to insure that all of the brine will be washed through the water softening resin. This forces all of the brine above the mineral bed in the free board of the water softener tank down through the bed of resin so that the latter portion of the brine, which remains quite clean, is passed through the bed of resin twice. This insures maximum utilization of the brine. After all of the brine is forced in downflow through the mineral bed it is followed by fresh water which rinses the brine from the mineral.

Meanwhile, the clock has continued to operate and the face plate has continued to rotate so that at about the time that the downflow regeneration step has been completed and the mineral bed has been thoroughly washed with fresh water, the leading edge of the outer spring hold down tab 57 has reached the upturned free end of the leaf spring member 78. When this occurs, the leaf spring member 78 is pushed down so that it depresses the actuator button of the microswitch 86. At the same time the hold down tab 53 continues to hold down the leaf spring member 77 to depress the actuator button of microswitch 85. Also, the contact arm 90 continues to depress the actuator buttons of microswitches 87 and 88.

Even though the vacuum on the lower chamber 102 of the vacuum switch dash-pot body may be relieved so that coil spring 114 may urge the plunger 97 back upwardly the latch member 93 is still held in released position under influence of coil spring 95. Thus, when hold down tab 57 depresses the leaf spring member 78 and pushes the actuator button of microswitch 86 in, as will be seen by reference to the circuit diagram, the line current now flows through microswitch 85 to microswitch 86 whose pole has now changed position to contact the lower contact plate to actuate solenoid 123. At the same time line current flows from microswitch 86 to microswitch 88 to re-energize solenoid 121. Solenoid 122 is de-energized when the change in position of the pole of microswitch 86 breaks the circuit.

The result of the de-energization of solenoid 122, the re-energization of solenoid 121 and energization of solenoid 123 is to close the drain for downflow regeneration and reopen the drain for upflow regeneration, and to supply an increased flow of water to the bottom of the water softener tank to be washed up through the mineral bed to backwash any iron or silt which may be left in the water softener tank and to thoroughly and completely rinse the brine from the water softener tank.

With the continued passage of time the spring hold down tabs 53 and 57 will eventually pass completely over the leaf spring members 77 and 78. When this happens, the leaf spring members lift from the actuator buttons of the microswitches 85 and 86 and the internal springs in those switches push the buttons outwardly to change the positions of the switch poles back to their original starting positions. The total length of the regeneration cycle is determined by the length of the regeneration hold down tab 53. When the trailing edge of tab 53 passes over the free end of leaf spring member 77 the line current to the remaining microswitches is cut off, so that it is immaterial whether spring member 78 continues thereafter to push upon the actuator button of microswitch 86.

When the current is shut off as the result of the release of spring member 77 by the hold down tab 53, the regeneration cycle is at an end and the water softener system is placed back into softening operation. Contact arm 90, actuator spring plate 71, link 66, latch arm 58, etc. are, however, still in regenerating cycle position. They may remain so for a period of several hours, but, as clock motor 44 continues to rotate face plate 46, the lug 63 projecting from the back of the face plate is brought into contact with the projecting lip 64 on the free end of the horizontal portion 65 of the latch arm 58.

The lug 63 pushes upwardly upon the latch arm which rotates on its pivot 59 until the vertical portion of the latch arm is moved sufficiently to be caught and held by the float arm 43. This gradual movement of latch arm 58 is transmitted through link 66 to the spring plate 71 which rotates upwardly around its pivot 72. As the spring plate 71 is lifted the rearwardly projecting arm 79 lifts the contact arm 90 upwardly permitting latch member 93 to spring back into place against plunger 97 of the vacuum switch dash-pot and the horizontal bracket portion 89A. Thus, the time control device is cocked for triggering the next regeneration cycle when the consumption of water has nearly exhaused the softening capacity of the mineral bed.

Although, the time control device of this invention has been described with particular reference to its utility in controlling the sequence of operation of solenoids which regulate the flows of water in an automatic water softening system, it will be readily apparent to those skilled in the art that the same time control mechanism can be readily adapted to control the sequence of operation of any series of electrically actuated mechanisms. Similarly, the control device may be utilized in simpler automatic water softening systems. For example, if the double upflow and downflow regeneration of the mineral bed is not deemed necessary in a particular installation, the water flows regulating regeneration can be controlled by means of a single solenoid-operated valve and the energization of that single solenoid can be controlled by the device of this invention requiring but a single hold down tab and a single leaf spring member to operate a single microswitch. Thus, in the simplest form, the time control device of this invention does not require the presence of the vacuum switch mechanism including microswitches 87 and 88, second microswitch 86, projecting arm 79, etc. It will be readily understood that these elements may be included or omitted, depending upon the particular sequence of operations desired to be controlled.

The time control device of this invention may be utilized to introduce virtually any desired sequence of operations into a water softening system. Thus, if desired, the system may be controlled so that the mineral water softening bed is given a back wash of fresh water to loosen and remove any dirt, silt, rust, etc., prior to introduction of the brine for regneration of the mineral bed. The device may be utilized to provide for downflow regeneration followed by upflow washing or to provide for upflow regeneration followed by downflow washing, as desired. It is to be understood, of course, that the basic construction of the time control device remains the same and that the particular sequenc of operations provided depends not upon variations in the construction of the device, but upon variations in the manner in which the time control unit is connected into the water softening system and upon the design of the water softening system itself.

While the invention is illustrated and described with particular reference to microswitches, it is to be understood that the invention is not so limited. Microswitches are preferred because their small size contributes to a more compact control unit. It will be obvious, of course, that larger, more conveniently sized switch means may be used without departing from the scope of the invention and where the expression "switch means" is used in the appended claims, its scope is not confined to microswitches.

While provision of check valve 110 in the oil dashpot of the vacuum switch means provides for rapid return of fluid from chamber 102 to chamber 101 and therefore provides for rapid return of diaphragms 105 and 106 and plunger 97 to their normal non-operative positions, this rapid return is not essential to the operation of the control device and the check valve 110 and the opening in which it is positioned may be omitted so long as spring 114 or some equivalent return means is provided. The pressure of the coil spring 114 upon the diaphragm 106 will force the oil from chamber 102 to return through opening 109 around the periphery of piston 108 to the chamber 101, but this will occur more slowly than if the check valve is provided. However, since in any automatic water softening system installation regeneration takes place only at widely spaced intervals, there is no real necessity for the rapid return of the plunger 97 to its normal position.

It is apparent that many modifications and variations of this invention as hereinbefore set forth may be made without departing from the spirit and scope thereof. The specific embodiments described are given by way of example only and the invention is limited only by the terms of the appended claims.

I claim:

1. A control device for regulating the sequence of operation of a plurality of electrically energized mechanisms, which device comprises a clock means, a plurality of switch means controlling the operation of said electrically energized mechanisms associated with said clock means, a plurality of means operable by said clock means for actuating part of said switch means, movable means for normally rendering said switch actuating means inoperative, means for shifting said movable means into operative position, and time delay means for actuating other of said switch means after some of said switch means have been first actuated by said movable means.

2. A control device for regulating the operation of an electrically energized mechanism, which device comprises a clock motor, a face plate rotatable with the shaft of said motor, at least one hold down tab projecting from the plane of said face plate, switch means positioned out of the plane of said face plate, said switch means including an actuating button in the path of rotation of said hold down tab but spaced out of direct contact with said tab, button depressing means interposed between said switch button and tab in the path of rotation of said tab and means for shifting the button depressing means into and out of operating position.

3. A control device according to claim 2 further characterized in that said clock motor and switch means are disposed on one side of a mounting, said face plate, button depressing means and position shifting means are disposed on the opposite side of the mounting, and an opening exists in said mounting between said switch means and button depressing means.

4. A control device according to claim 3 further characterized in that said button depressing means comprises a leaf spring member pivotally movable into and out of operating position in the path of rotation of said face plate hold down tab over the mounting opening between said switch means and button depressing means.

5. A control device according to claim 4 further characterized in that latch means are provided to hold said button depressing means out of operating position and spring means are provided to move said button depressing means into operating position upon release of said latch.

6. A control device according to claim 5 further characterized by the provision of pin means on said clock face plate adapted in its path of rotation to contact said latch means and return said button depressing means to nonoperating position.

7. A control device for regulating the sequence of operation of a plurality of electrically energized mechanisms, which device comprises a clock motor, a face plate rotatable with the shaft of said motor, a pair of radially spaced hold down tabs projecting from the plane of said face plate, switch means positioned out of the plane of said face plate, said switch means including a pair of actuating buttons each in the path of one of said hold down tabs but spaced out of direct contact with said tab, dual button depressing means interposed between said switch buttons and tabs in the paths of rotation of said tabs and means for shifting the button depressing means into and out of operating position.

8. A control device according to claim 7 further characterized in that said button depressing means comprises a bifurcated leaf spring member pivotally movable into and out of operating position in the path of rotation of said hold down tabs.

9. A control device according to claim 8 further characterized in that spring means are provided to hold said button depressing means in operating position and latch means are provided to hold said button depressing means out of operating position.

10. A control device according to claim 9 further characterized by the provision of a projecting pin on said clock face plate adapted in its path of rotation to contact a projecting lip on said latch means and return said button depressing means to nonoperating position.

11. A control device according to claim 7 characterized by the provision of further switch means including a second pair of actuating buttons, common contact means for simultaneously depressing said second pair of actuating buttons, latch means for releasing said common contact means, a projection on said means for shifting the button depressing means into and out of operating position extending into the path of said common contact means to control the movement of said contact means, and time delay means for releasing said latch means.

12. A control device according to claim 11 further characterized in that said time delay means includes a pair of resilient diaphragms, a latch releasing plunger movable with said diaphragms, a restricted opening between said diaphragms and a relatively incompressible fluid in the spaces between said diaphragms.

13. A control device for regulating the sequence of operation of an electrically energized mechanism such as a solenoid, which device comprises a mounting plate, a clock motor supported on one side of said mounting plate, and having a shaft extending to the opposite side of the mounting plate, a face plate on said shaft and rotatable therewith, at least one hold down tab projecting rearwardly from said face plate, an opening in said mounting plate under the path of rotation of said hold down tab, at least one double throw, a single pole microswitch supported on said mounting plate, the actuating button of said switch being positioned in said opening under the path of rotation of said hold down tab, leaf spring button depressing means pivotally supported on said mounting plate over said opening between the switch button and hold down tab in the path of rotation of said tab, and latch and spring means on said mounting plate connected to said button depressing means for holding the button depressing means out of operating position and shifting into operating position upon release of said latch.

14. A control device for regulating the sequence of operation of a plurality of electrically energized mechanisms such as solenoids, said device comprising a mounting plate, a clock motor on one side of said mounting plate having a shaft extending to the opposite side of the mounting plate, a face plate on said shaft and rotatable therewith, a pair of spaced hold down tabs projecting from said face plate, an opening in said mounting plate under the path of rotation of said hold down tabs, a pair of double throw, single pole microswitches supported on said mounting plate, the actuating buttons of said switches being positioned in said opening each under the path of rotation of one of said hold down tabs, dual leaf spring button depressing means pivotally supported on said mounting plate over said opening between the switch buttons and hold down tabs in the paths of rotation of said tabs, first latch and spring means on said mounting plate connected to said button depressing means for holding the button depressing means out of operating position and shifting into operating position upon release of said latch, a second pair of microswitches supported on said mounting plate, a common contact arm for simultaneously depressing the actuating buttons of said second pair of switches, further latch means for restraining movement of said contact arm, projecting arm means on said button depressing means extending in the path of said contact arm whereby said contact arm is lifted to render said second pair of microswitches inoperative when said button depresisng means is held out of operating position, and time delay means for releasing said further latch means.

15. A control device according to claim 14 further characterized in that said time delay means includes a pair of resilient diaphragms, a latch releasing plunger movable with said diaphragms, a restricted opening between said diaphragms and a relatively incompressible fluid in the spaces between said diaphragms.

16. A control device according to claim 15 further characterized in that said time delay means is vacuum actuated.

17. A control device according to claim 15 further characterized in that projecting pin means are provided on said clock face plate for returning said leaf spring button depressing means to nonoperating position and said projecting arm means on said button depressing means simultaneously returns said contact arm to nonoperating position.

References Cited in the file of this patent

UNITED STATES PATENTS

| | | |
|---|---|---|
| 2,350,938 | Sparrow | June 6, 1944 |
| 2,596,330 | Everard | May 13, 1952 |
| 2,637,788 | Bracken | May 5, 1953 |
| 2,714,293 | Duncan | Aug. 2, 1955 |
| 2,788,068 | Blumenfeld | Apr. 9, 1957 |
| 2,798,124 | Sharbaugh | July 2, 1957 |
| 2,804,513 | Oppel | Aug. 27, 1957 |
| 2,832,856 | Goodhouse | Apr. 29, 1958 |
| 2,853,567 | Kock | Sept. 23, 1958 |
| 2,902,557 | Brockman | Sept. 1, 1959 |

FOREIGN PATENTS

| | | |
|---|---|---|
| 560,113 | Great Britain | Mar. 21, 1944 |

UNITED STATES PATENT OFFICE

CERTIFICATE OF CORRECTION

Patent No. 3,055,994                          September 25, 1962

Stanley A. Lundeen

It is hereby certified that error appears in the above numbered patent requiring correction and that the said Letters Patent should read as corrected below.

Column 10, line 44, for "conviently" read -- conventionally --; column 12, line 25, strike out "a".

Signed and sealed this 15th day of January 1963.

(SEAL)
Attest:

ERNEST W. SWIDER
Attesting Officer

DAVID L. LADD
Commissioner of Patents